United States Patent
Chen (10) Patent No.: US 9,661,532 B2
(45) Date of Patent: May 23, 2017

(54) APPARATUSES AND METHODS FOR HANDLING INTER-RADIO ACCESS TECHNOLOGY (INTER-RAT) MOBILITY

(75) Inventor: Te-Ming Chen, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 583 days.

(21) Appl. No.: 13/155,038

(22) Filed: Jun. 7, 2011

(65) Prior Publication Data

US 2011/0306344 A1    Dec. 15, 2011

Related U.S. Application Data

(60) Provisional application No. 61/353,954, filed on Jun. 11, 2010.

(51) Int. Cl.
*H04W 36/00* (2009.01)
*H04W 36/14* (2009.01)

(52) U.S. Cl.
CPC ... *H04W 36/0066* (2013.01); *H04W 36/0072* (2013.01); *H04W 36/14* (2013.01)

(58) Field of Classification Search
CPC ............ H04W 72/0406; H04W 72/042; H04W 36/0072; H04W 88/06; H04W 72/04; H04W 76/02; H04W 36/0016; H04W 36/14; H04W 72/0446; H04W 76/046
USPC ........ 370/331, 332; 455/435.1, 435.2, 435.3, 455/436, 442, 449
See application file for complete search history.

(56) References Cited

U.S. PATENT DOCUMENTS

| | | | |
|---|---|---|---|
| 2004/0029586 A1* | 2/2004 | Laroia | H04W 16/12 455/434 |
| 2007/0064666 A1* | 3/2007 | Kwun | H04W 72/06 370/343 |
| 2008/0318578 A1* | 12/2008 | Worrall | H04W 36/02 455/437 |

(Continued)

OTHER PUBLICATIONS

Need to reduce size of handover to E-UTRA message, Samsung, 3GPP TSG-RAN2#65bis meeting, Tdoc R2-092206, Mar. 23-27, 2009.*

(Continued)

*Primary Examiner* — George Eng
*Assistant Examiner* — Jing Gao
(74) *Attorney, Agent, or Firm* — Birch, Stewart, Kolasch & Birch, LLP (57) ABSTRACT

A mobile communications device with a wireless module and a controller module is provided. The wireless module performs wireless transmissions and receptions to and from a first service network being an LTE system. The controller module receives, from the first service network, a handover request message for handing over from the first service network to a second service network via the wireless module, and determines whether all configurations in the handover request message are compliable or whether there is a protocol error in the handover request message. Particularly, the second service network utilizes a wireless technology other than the LTE technology, and the handover request message is a MobilityFromEUTRACommand message. Also, the controller module transmits a connection re-establishment request message indicating a reconfiguration failure to the first service network via the wireless module, in response to one of the determinations is positive.

2 Claims, 7 Drawing Sheets

(56) References Cited

U.S. PATENT DOCUMENTS

2010/0166184 A1* 7/2010 Wu .............................. 380/270
2010/0272067 A1* 10/2010 Lu et al. ....................... 370/331

OTHER PUBLICATIONS

3GPP TS 36.331 V9.1.0 (Dec. 2009), 3rd Generation Partnership Project; Technical Specification Group Radio Access Network; Evolved Universal Terrestrial Radio Access (E-UTRA); Radio Resource Control (RRC); Protocol Specification (Release 9).*
3rd Generation Partnership Project, "Technical Specification Group Radio Access Network; Evolved Universal Terrestrial Radio Access (E-UTRA); Radio Resource Control (RRC); Protocol Specification (Release 9)", 3GPP TS 36.331, V 9.2.0, Mar. 2010, pp. 1-248.
HTC, "Clarification on Mobility to E-UTRA", 3GPP TSG-RAN2 Meeting #70bis, R2-103929, Jun. 28-Jul. 2, 2010, Stockholm, Sweden, pp. 1-8.
Samsung et al., "Clarifications Regarding Handover to E-UTRAN", 3GPP TSG-RAN2 WG2 Meeting #70 bis, R2-104175, Jun. 28-Jul. 2, 2010, Stockholm, Sweden, pp. 1-3.
3GPP TS 36.331 V9.1.0 (Dec. 2009), 3rd Generation Partnership Project; Technical Specification Group Radio Access Network; Evolved Universal Terrestrial Radio Access (E-UTRA) Radio Resource Control (RRC); Protocol specification (Release 9).

3GPP TS 36.331 V8.6.0 (Jun. 2009); 3rd Generation Partnership Project; Technical Specification Group Radio Access Network; Evolved Universal Terrestrial Radio Access (E-UTRA) Radio Resource Control (RRC); Protocol specification (Release 8); pp. 1-207.
Asustek: "The re-establishment cause for mobility from E-UTRA failure", 3GPP TSG-RAN WG2 Meeting #67, Shenzhen, China, Aug. 24-28, 2009; pp. 1-4.
LG Electronics Inc., "Restructuring of mobiliy From E-UTRA," 3GPP TSG-RAN2 Meeting #64, R2-086713. Nov. 10-14, 2008; 8 pages.
NTT Docomo, "Downlink piggybacking of NAS messages at handover," 3GPP TSG RAN WG5 #40bis, R5-084140, Oct. 6-9, 2008; 2 pages.
3GPP TS 36.331 V8.9.0 (Mar. 2010); 3rd Generation Partnership Project; Technical Specification Group Radio Access Network; Evolved Universal Terrestrial Radio Access (E-UTRA); Radio Resource Control (RRC); Protocol specification (Release 8); 211 pgs.
3GPP TS 36.331 V8.7.0 (Sep. 2009); 3rd Generation Partnership Project; Technical Specification Group Radio Access Network; Evolved Universal Terrestrial Radio Access (E-UTRA); Radio Resource Control (RRC); Protocol specification (Relase 8), 7 pages.
3GPP TSG-RAN2#65bis meeting Tdoc R2-092206, published on Mar. 23-27, 2009; Samsung; "Need to reduce size of handover to E-UTRA message"; pp. 1-3.

* cited by examiner

APPARATUSES AND METHODS FOR HANDLING INTER-RADIO ACCESS TECHNOLOGY (INTER-RAT) MOBILITY

CROSS REFERENCE TO RELATED APPLICATIONS

This Application claims priority of U.S. Provisional Application No. 61/353,954, filed on Jun. 11, 2010, and the entirety of which is incorporated by reference herein.

BACKGROUND OF THE INVENTION

Field of the Invention

The invention generally relates to handover handling, and more particularly, to apparatuses and methods for handling inter-Radio Access Technology (inter-RAT) mobility.

Description of the Related Art

In a typical mobile communications environment, a user equipment (UE), including a mobile telephone (also known as a cellular or cell phone), a laptop computer with wireless communications capability, or a personal digital assistant (PDA) etc., may communicate voice and/or data signals with one or more service network. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and others.

Figure 1:
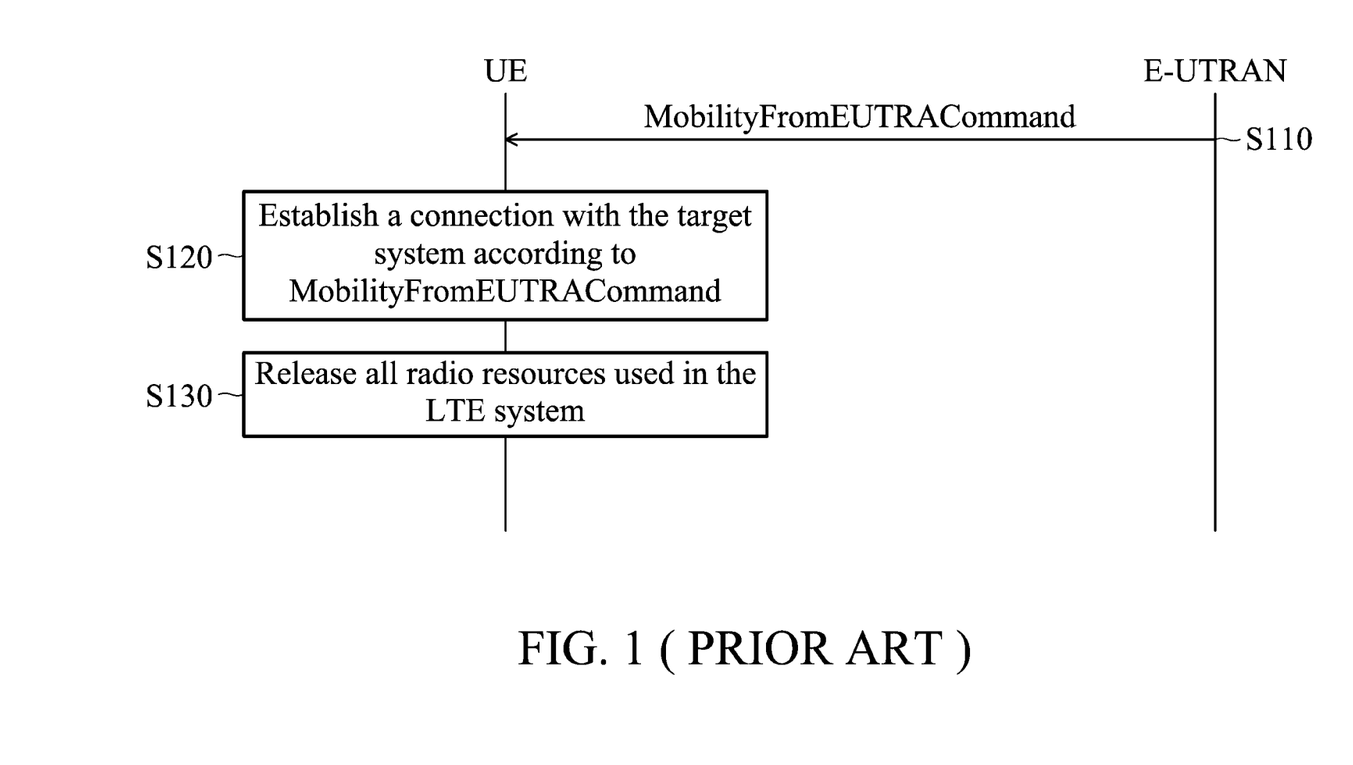
FIG. 1 is a message sequence chart illustrating a successful mobility from E-UTRA procedure.
Figure 2:
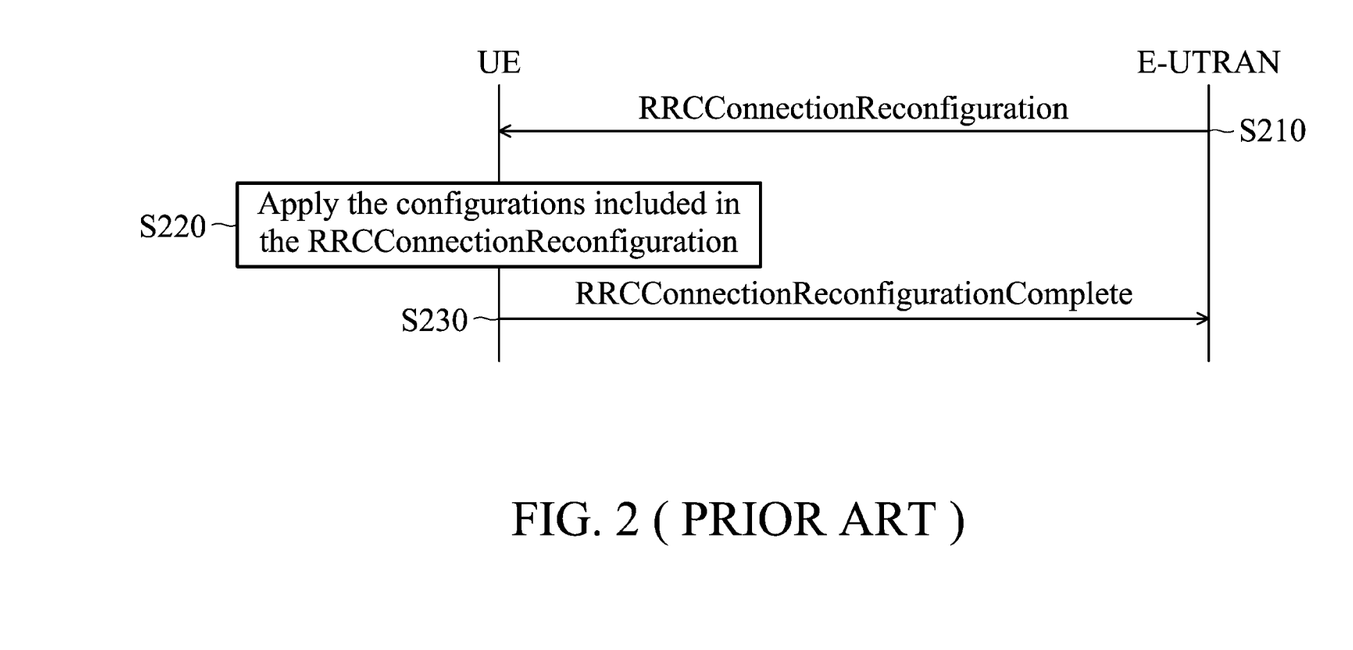
FIG. 2 is a message sequence chart illustrating a successful handover to E-UTRA procedure.

Take the LTE technology in compliance with the 3GPP TS 36.331 specification (referred to herein as the TS36.331 specification) as an example. A mobility from E-UTRA (Evolved-Universal Terrestrial Radio Access) procedure is performed for moving a UE in the connected mode with an LTE system to a cell using another RAT, e.g., GSM, GPRS, WCDMA, or CDMA-2000 technology. One of the mobility types may be a handover in which the LTE system may communicate with the target system for allocating radio resources for the UE. Another one of the mobility types may involve a Circuit-Switched (CS) fallback procedure, such as an enhanced CS fallback to CDMA-2000 technology. Alternatively, the CS fallback procedure may be combined with a concurrent handover from the LTE system to a CDMA-2000 system. FIG. 1 is a message sequence chart illustrating a successful mobility from E-UTRA procedure. The E-UTRAN (Evolved-Universal Terrestrial Radio Access Network) of an LTE system prepares and transmits a MobilityFromEUTRACommand message to the UE (step S110), wherein the MobilityFromEUTRACommand message contains configurations of the radio resources allocated for the UE in the target system. When receiving the MobilityFromEUTRACommand message, the UE establishes a connection with the target system according to the configurations of the allocated radio resources in the target system (step S120). After that, the UE releases all radio resources used in the LTE system (step S130), and the mobility from E-UTRA procedure ends. On the other hand, a handover to E-UTRA procedure is performed for transferring a connection between a UE and another Radio Access Network (RAN) to an E-UTRAN. FIG. 2 is a message sequence chart illustrating a successful handover to E-UTRA procedure. The handover to E-UTRA procedure is started by the UE receiving an RRCConnectionReconfiguration message from the E-UTRAN via the RAN which uses an RAT other than the LTE technology and initiates the handover to E-UTRA procedure (step S210). Subsequently, the UE applies the configurations included in the RRCConnectionReconfiguration message (step S220), such as configurations of the radio resources allocated for the UE in the LTE system, security-related configurations, and mobility control information, etc. Next, the UE replies to the E-UTRAN with an RRCConnectionReconfigurationComplete message (step S230), to inform the LTE system of the successful completion of the handover to E-UTRA procedure.

BRIEF SUMMARY OF THE INVENTION

Accordingly, embodiments of the invention provide apparatuses and methods for handling inter-RAT mobility, including mobility from E-UTRA and handover to E-UTRA. In one aspect of the invention, a mobile communications device comprising a wireless module and a controller module is provided. The wireless module performs wireless transmissions and receptions to and from a first service network. The controller module receives, from the first service network, a handover request message for handing over from the first service network to a second service network via the wireless module, and determines whether all configurations in the handover request message are compliable or whether there is a protocol error in the handover request message. Particularly, the first service network and the second service network are a Long Term Evolution (LTE) system and a mobile communication system utilizing a wireless technology other than the LTE technology, respectively, and the handover request message is a MobilityFromEUTRACommand message. Also, the controller module transmits a connection re-establishment request message indicating a reconfiguration failure to the first service network via the wireless module in response to some or all of the configurations in the handover request message not being compliable or the protocol error being in the handover request message.

In yet another aspect of the invention, a mobile communications device comprising a wireless module and a controller module is provided. The wireless module performs wireless transmissions and receptions to and from a first service network. The controller module receives, from the first service network, a handover request message for handing over from the first service network to a second service network via the wireless module, and applies configurations of dedicated radio resources and common radio resources in the handover request message. Particularly, the first service network and the second service network are a mobile communication system utilizing a wireless technology other than the Long Term Evolution (LTE) technology and an LTE system, respectively, and the handover request message comprises an RRCConnectionReconfiguration message.

Other aspects and features of the present invention will become apparent to those with ordinarily skill in the art upon review of the following descriptions of specific embodiments of apparatuses and methods for handling inter-RAT mobility.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Note that, during a mobility from E-UTRA procedure, if the UE determines that not all of configurations in the MobilityFromEUTRACommand message are compliable and/or there is a protocol error in the MobilityFromEUTRACommand message, the mobility from E-UTRA procedure is considered to have failed and then the UE initiates a connection re-establishment procedure by transmitting an RRCConnectionReestablishmentRequest message to the E-UTRAN, which includes a re-establishment cause indicating a handover failure. However, the real cause for initiating the connection re-establishment procedure is a reconfiguration failure for some or all of the configurations in the MobilityFromEUTRACommand message not being compliable or a protocol error being in the MobilityFromEUTRACommand message. This may result in inefficiency of the LTE system since inappropriate operations may be performed in response to the wrong re-establishment cause. In addition, during a handover procedure to E-UTRA from other RATs, when applying the configurations included in the RRCConnectionReconfiguration message, the UE only focuses on the configurations of the dedicated radio resources and ignores the configurations of the common radio resources. Omitting the configurations of the common radio resources may cause problems of the connection between the UE and the LTE system after the handover. Thus, the invention proposes methods for fixing the problems in both of the mobility from E-UTRA procedure and the handover to E-UTRA procedure as described above.

Figure 3:
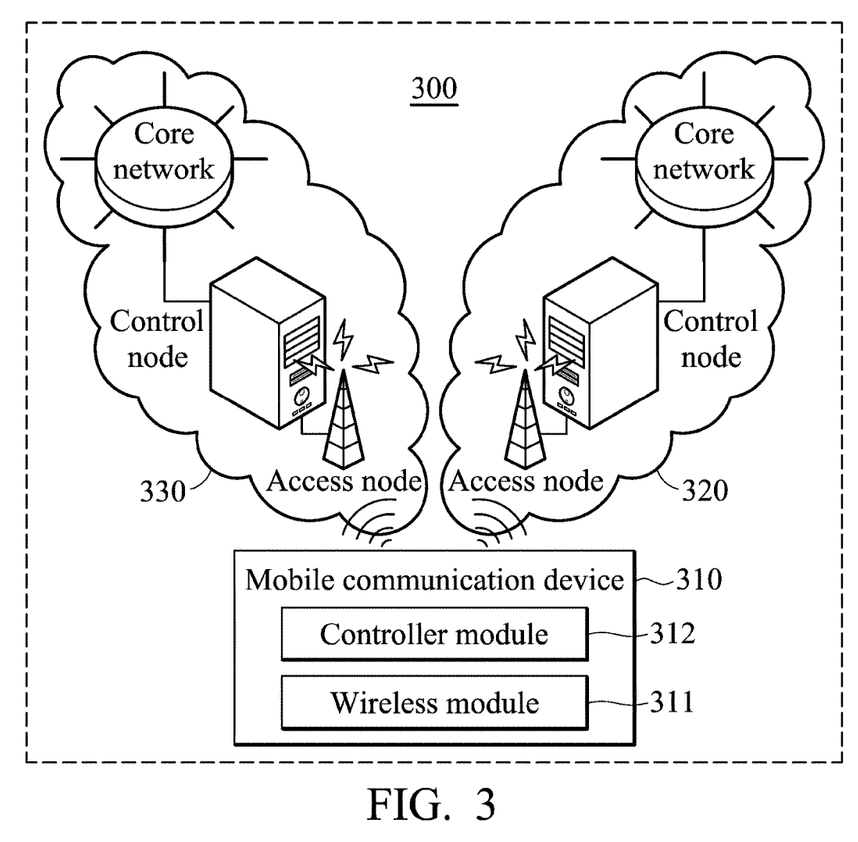
FIG. 3 is a block diagram illustrating a mobile communication environment according to an embodiment of the invention.

FIG. 3 is a block diagram illustrating a mobile communication environment according to an embodiment of the invention. In the mobile communications environment 300, the mobile communication device 310 is wirelessly connected to one of the service networks 320 and/or 330 for obtaining wireless services. Each of the service networks 320 and 330 comprises at least one access node for performing wireless transmissions and receptions to and from the mobile communication device 310, and a control node for controlling the operation of the at least one access node, and the control node is further connected to a core network. Particularly, the service networks 320 and 330 provides wireless services using different RATs, i.e., the service networks 320 and 330 operate in accordance with two different wireless communication protocols. The mobile communication device 310 comprises a wireless module 311 for performing the functionality of wireless transmissions and receptions to and from the service networks 320 and 330. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the RAT in use. Also, the mobile communication device 310 comprises a controller module 312 for controlling the operation of the wireless module 311 and other functional components, such as a display unit and/or keypad serving as the MMI (man-machine interface), a storage unit storing the program codes of applications or communication protocols, or others.

Figure 4:
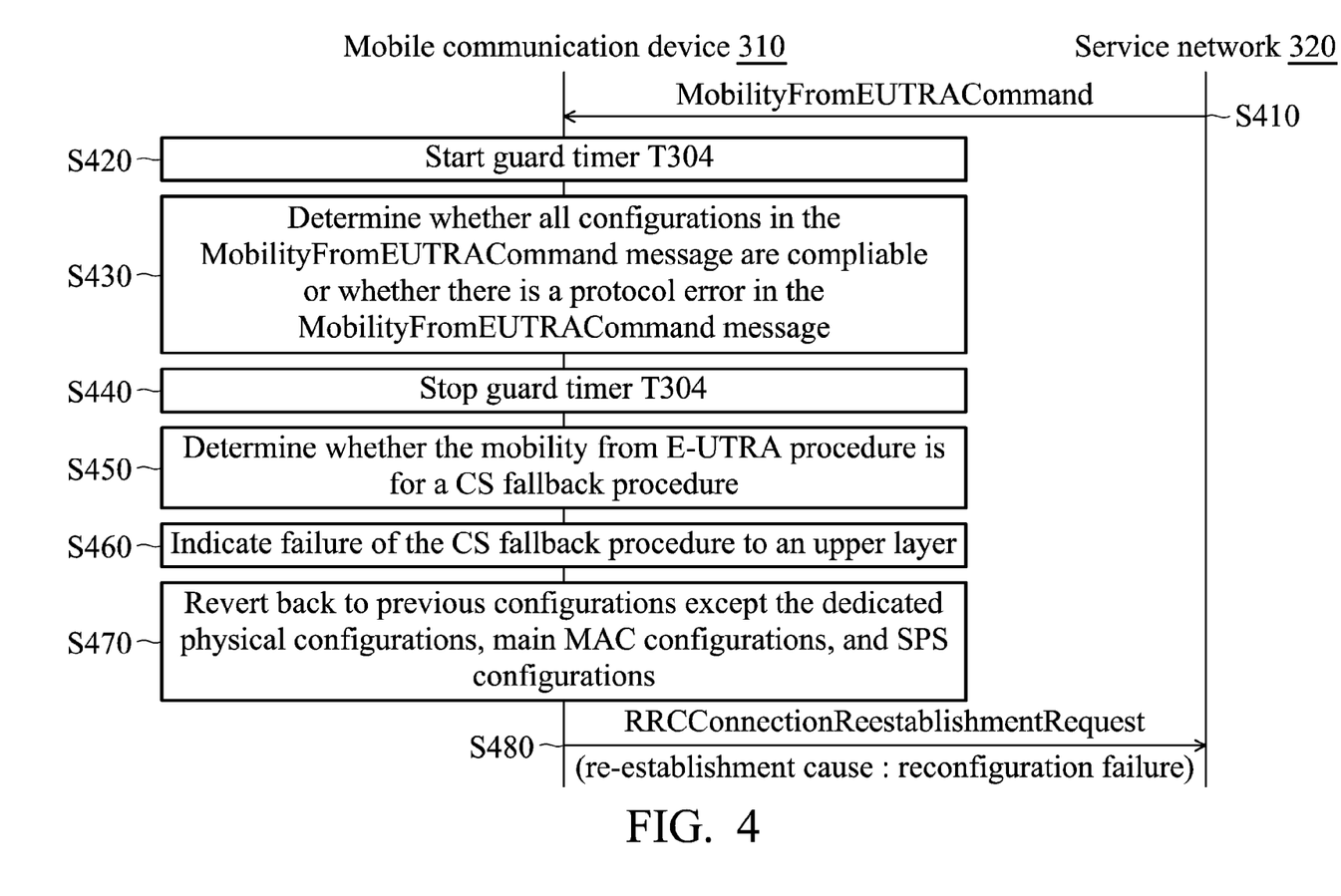
FIG. 4 is a message sequence chart illustrating an unsuccessful mobility from E-UTRA procedure according to an embodiment of the invention.

To be more specific, the controller module 312 controls the wireless module 311 for performing inter-RAT mobility procedures, including mobility from E-UTRA procedures and the handover to E-UTRA procedures. FIG. 4 is a message sequence chart illustrating an unsuccessful mobility from E-UTRA procedure according to an embodiment of the invention. In this embodiment, the service network 320 is an LTE system and the service network 330 is a WCDMA system. Specifically, the communications between the mobile communication device 310 and the service network 320 are in compliance with the TS36.331 specification and/or other 3GPP specifications for the LTE technology, while the communications between the mobile communication device 310 and the service network 330 are in compliance with the 3GPP specifications for the WCDMA technology. In another embodiment, the service network 330 may be a GSM, GPRS, or CDMA-2000 system, or a mobile communication system using any RAT other than the LTE technology. After being powered on, the mobile communication device 310 connects to the service network 320 for obtaining wireless services therefrom. Later, when the service network 320 decides to transfer the mobile communication device 310 to be served by the service network 330 instead, it initiates the mobility from E-UTRA procedure by transmitting a MobilityFromEUTRACommand message to the mobile communication device 310 (step S410), wherein the MobilityFromEUTRACommand message may contain configurations of the radio resources allocated for the mobile communication device 310 in the service network 330. Specifically, the mobility from E-UTRA procedure may cover 3 types of inter-RAT mobility, including an inter-RAT handover, a cell change order, and an enhanced CS fallback.

When receiving the MobilityFromEUTRACommand message, the controller module 312 first starts a guard timer T304 for controlling the mobility from E-UTRA procedure (step S420) and then determines whether all configurations in the MobilityFromEUTRACommand message are compliable or whether there is a protocol error in the MobilityFromEUTRACommand message (step S430). In this embodiment, since some or all of the configurations in the MobilityFromEUTRACommand message are not compliable or there is a protocol error in the MobilityFromEUTRACommand message, the mobility from E-UTRA procedure is considered to have failed. In response to the failure of the mobility from E-UTRA procedure, the controller module 312 stops the guard timer T304 (step S440) and determines whether the mobility from E-UTRA procedure is for a CS fallback procedure (step S450). Specifically, the MobilityFromEUTRACommand message may contain a cs-FallbackIndicator field which is set to TRUE, so that the controller module 312 may determine that the mobility from E-UTRA procedure is for a CS fallback procedure. In this embodiment, since the mobility from E-UTRA procedure is for an enhanced CS fallback, the controller module 312 further indicates failure of the CS fallback procedure to an upper layer, such as the EPS (Evolved Packet System) Mobility Management (EMM) layer (step S460). Subsequently, the controller module 312 reverts back to the previous configurations applied prior to receiving the MobilityFromEUTRACommand message, except for the dedicated physical configurations, main Medium Access Control (MAC) configurations, and Semi-Persistent Scheduling (SPS) configurations in the MobilityFromEUTRACommand message (step S470). After that, the controller module 312 initiates an RRC connection re-establishment procedure by transmitting an RRCConnectionReestablishmentRequest message indicating a reconfiguration failure to the service network 320 via the wireless module 311 (step S480), instead of indicating a handover failure as in a conventional LTE UE. Specifically, the RRCConnectionReestablishmentRequest message contains a re-establishment cause for indicating the reconfiguration failure. Note that, for the service network 320, better actions may be taken or more efficient operations may be performed in response to being informed of a correct re-establishment cause.

Figure 5:
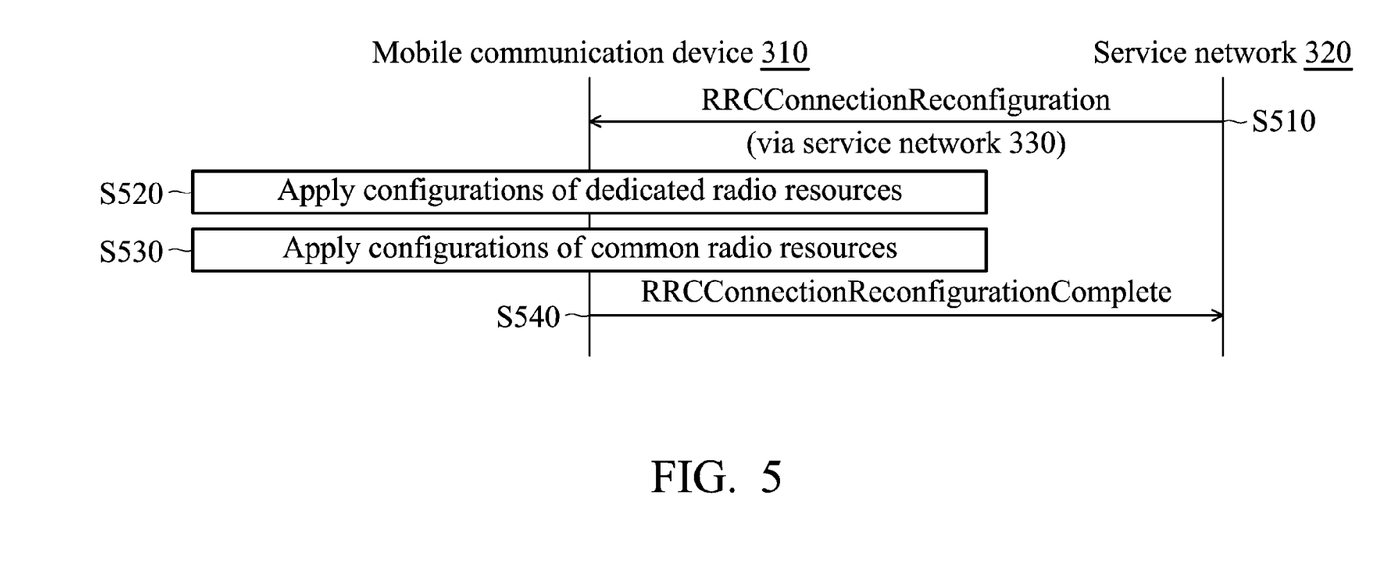
FIG. 5 is a message sequence chart illustrating a successful handover to E-UTRA procedure according to an embodiment of the invention.

FIG. 5 is a message sequence chart illustrating a successful handover to E-UTRA procedure according to an embodiment of the invention. Similar to FIG. 4, the service network 320 is an LTE system and the service network 330 is a WCDMA system. That is, the communications between the mobile communication device 310 and the service network 320 are in compliance with the TS36.331 specification and/or other 3GPP specifications for the LTE technology, while the communications between the mobile communication device 310 and the service network 330 are in compliance with the 3GPP specifications for the WCDMA technology. Alternatively, the service network 330 may be a GSM, GPRS, or CDMA-2000 system, or a mobile communication system using any RAT other than the LTE technology. After being powered on, the mobile communication device 310 connects to the service network 330 to obtain wireless services therefrom. Later, when the service network 330 decides to transfer the mobile communication device 310 to be served by the service network 320 instead, it initiates the handover to E-UTRA procedure by requesting the service network 320 to prepare for the handover. The service network 320 prepares an RRCConnectionReconfiguration message and transmits the RRCConnectionReconfiguration message to the mobile communication device 310 via the service network 330 (step S510). Specifically, the service network 330 may place the RRCConnectionReconfiguration message in a HandoverFromUTRAN message which is in compliance with the 3GPP specifications for the WCDMA technology, and transmit the HandoverFromUTRAN message to the mobile communication device 310. Particularly, the RRCConnectionReconfiguration message may include parameters of the configurations of the dedicated radio resources and the common radio resources. When receiving the HandoverFromUTRAN message, the controller module 312 retrieves the RRCConnectionReconfiguration message and applies the parameters of the configurations of the common radio resources therein (step S520). Next, the controller module 312 also applies the parameters of the configurations of the dedicated radio resources therein (step S530). In one embodiment, before performing step S530, the controller module 312 may first determine whether at least one parameter of the configuration of the common radio resources and at least one parameter of the configuration of the dedicated radio resources configure the same field. If so, in step S530, the controller module 312 may only apply the parameters of the configurations of the dedicated radio resources, which are not covered by the parameters of the configuration of the common radio resources. After that, the controller module 312 further prepares and transmits an RRCConnectionReconfigurationComplete message to the service network 320 (step S540), to end the handover to E-UTRA procedure.

Figure 6:
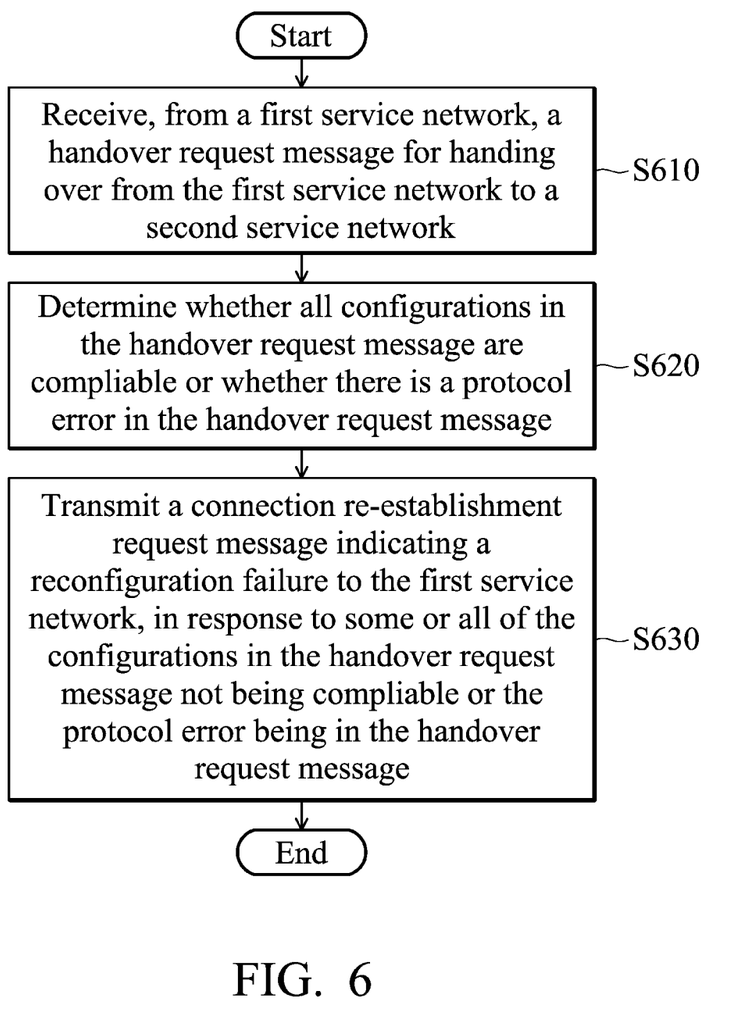
FIG. 6 is a flow chart illustrating the method for handling an inter-RAT mobility by a mobile communication device according to an embodiment of the invention.

FIG. 6 is a flow chart illustrating the method for handling an inter-RAT mobility by a mobile communication device according to an embodiment of the invention. Taking the mobile communication device 310 as an example for illustrating the method, initially, the mobile communication device 310 is connected with the service network 320 which is in compliance with a first communication protocol. To begin the method, the mobile communication device 310 receives, from the service network 320, a handover request message for handing over from the service network 320 to the service network 330 (step S610), wherein the service network 330 is in compliance with a second communication protocol. That is, the service networks 320 and 330 use different wireless technologies, since they operate in accordance with two different wireless communication protocols. In one embodiment, the service network 320 may be an LTE system, and the handover request message may be a MobilityFromEUTRACommand message which contains configurations of the radio resources allocated for the mobile communication device 310 in the service network 330. Next, the mobile communication device 310 determines whether all of the configurations in the handover request message are compliable or whether there is a protocol error in the handover request message (step S620). If some or all of the configurations in the handover request message are not compliable or there is a protocol error in the handover request message, the inter-RAT mobility is considered to have failed and the mobile communication device 310 initiates a connection re-establishment procedure by transmitting a connection re-establishment request message indicating a reconfiguration failure to the service network 320 (step S630). Specifically, if the service network 320 is an LTE system, the connection re-establishment request message may be an RRCConnectionReestablishmentRequest message which contains a re-establishment cause for indicating the reconfiguration failure message.

In addition to initiating the connection re-establishment procedure, the mobile communication device 310 may further stop the guard timer for controlling the inter-RAT mobility and determine whether the inter-RAT mobility is for a CS fallback procedure. Specifically, the handover request message may contain a cs-FallbackIndicator field, and accordingly, the mobile communication device 310 may determine whether the inter-RAT mobility is for a CS fallback procedure. If the inter-RAT mobility is for a CS fallback procedure, the mobile communication device 310 may indicate failure of the CS fallback procedure to an upper layer, such as the EMM layer in an LTE UE. Also, the mobile communication device 310 may revert back to the previous configurations applied prior to receiving the handover request message, except for some specific configurations in the handover request message. Specifically, if the handover request message is a MobilityFromEUTRACommand message, the specific configurations excluded from the reverting step may be the dedicated physical configurations, main MAC configurations, and SPS configurations in the MobilityFromEUTRACommand message.

Figure 7:
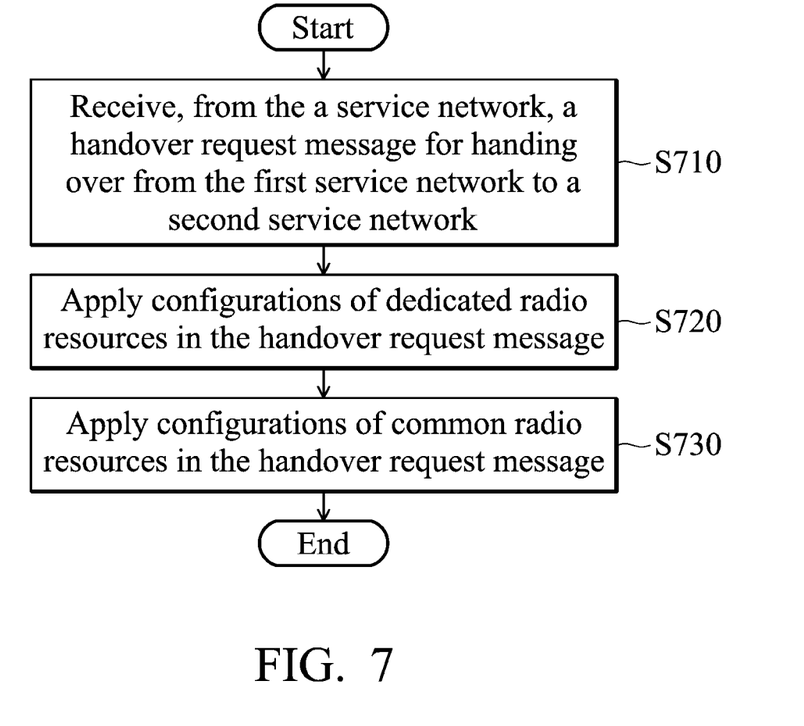
FIG. 7 is a flow chart illustrating the method for handling an inter-RAT mobility by a mobile communication device according to another embodiment of the invention.

FIG. 7 is a flow chart illustrating the method for handling an inter-RAT mobility by a mobile communication device according to another embodiment of the invention. Taking the mobile communication device 310 as an example for illustrating the method, initially, the mobile communication device 310 is connected with the service network 330 which is a WCDMA system. Alternatively, the service network 330 may be a GSM, GPRS, or CDMA-2000 system, or a mobile communication system using any RAT other than the LTE technology. To begin the method, the mobile communication device 310 receives, from the service network 330, a handover request message for handing over from the service network 330 to the service network 320 (step S710), wherein the service network 320 is an LTE system. In one embodiment, the handover request message may be an RRCConnectionReconfiguration message which is contained in a HandoverFromUTRAN message. The handover request message may include the parameters of the configurations of the dedicated radio resources and the common radio resources. Next, the mobile communication device 310 applies the parameters of the configurations of the common radio resources in the handover request message (step S720). Also, the mobile communication device 310 applies the parameters of the configurations of the dedicated radio resources in the handover request message (step S730).

In one embodiment, before step S730, the mobile communication device 310 may first determine whether at least one parameter of the configuration of the common radio resources and at least one parameter of the configuration of the dedicated radio resources configure the same field. If so, in step S730, the mobile communication device 310 may only apply the parameters of the configurations of the dedicated radio resources, which are not covered by the parameters of the configuration of the common radio resources, In addition, after successfully applying the configurations of the dedicated radio resources and the common radio resources, the mobile communication device 310 may further prepare and transmit a handover completion message to the service network 320, to inform the service network 320 of the successful completion of the inter-RAT mobility. Specifically, if the service network 320 is an LTE system, the handover completion message may be an RRCConnectionReconfigurationComplete message.

Note that, although the service network 320 is only described as an LTE system in the proposed embodiments above, the service network 320 may be an LTE-Advanced system or may be a mobile communication system using any future evolutionary technology of the LTE technology family. On the other hand, the service network 330 may be a mobile communication system using any RAT other than the RAT used by the service network 320. For example, in one embodiment, the service network 320 is an LTE system and the service network 330 is a CDMA system; while in another embodiment, the service network 320 is an LTE system and the service network 330 is a CDMA-2000 system, and the invention is not limited thereto. Moreover, the service network 330 may be further selected from a GSM system, a GPRS system, a TD-SCDMA system, a WiMAX system, a WiBro system, or others.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communication device, comprising:
a wireless module performing wireless transmissions and receptions to and from a first service network, wherein the first service network is a mobile communication system utilizing a wireless technology other than a Long Term Evolution (LTE) technology; and
a controller module receiving, from the first service network, a handover request message for handing over from the first service network to a second service network via the wireless module, and applying parameters of configurations of common radio resources in the handover request message,
wherein the second service network is an LTE system, and the handover request message comprises an RRCConnectionReconfiguration message, and
wherein the controller module is further configured to apply at least one parameter of configuration of dedicated radio resources in the handover request message, when the at least one parameter of configuration of dedicated radio resources does not configure a same field as by any of the parameters of configuration of common radio resources, and not apply the at least one parameter of configuration of dedicated radio resources in the handover request message, when the at least one parameter of configuration of dedicated radio resources configures the same field as by any of the parameters of configuration of common radio resources.

2. The mobile communication device of claim 1, wherein the at least one parameter of configuration of the dedicated radio resources is applied after applying the parameters of configuration of the common radio resources.

* * * * *